US012243505B2

(12) United States Patent
Adachi et al.

(10) Patent No.: US 12,243,505 B2
(45) Date of Patent: Mar. 4, 2025

(54) WIND INSTRUMENT AND KEY FOR WIND INSTRUMENT

(71) Applicant: YAMAHA CORPORATION, Hamamatsu (JP)

(72) Inventors: Hiraku Adachi, Hamamatsu (JP); Tomoji Hirakata, Queens, NY (US)

(73) Assignee: YAMAHA CORPORATION, Hamamatsu (JP)

( * ) Notice: Subject to any disclaimer, the term of this patent is extended or adjusted under 35 U.S.C. 154(b) by 217 days.

(21) Appl. No.: 18/176,646

(22) Filed: Mar. 1, 2023

(65) Prior Publication Data

US 2024/0296815 A1 Sep. 5, 2024

(51) Int. Cl.
*G10D 9/047* (2020.01)

(52) U.S. Cl.
CPC .................................... *G10D 9/047* (2020.02)

(58) Field of Classification Search
CPC ...................................................... G10D 9/047
See application file for complete search history.

(56) References Cited

U.S. PATENT DOCUMENTS 2,036,492 A * 4/1936 Pedler .................... G10D 7/066 84/382
2,164,110 A * 6/1939 Haynes .................. G10D 9/047 984/145
5,477,766 A * 12/1995 Ellsworth .............. G10D 9/047 84/382
6,559,366 B1 * 5/2003 Takahashi .............. G10D 9/047 84/380 R
7,544,874 B2 * 6/2009 Hsieh ....................... G10D 7/08 84/453
8,476,513 B2 * 7/2013 Ponzol ..................... G10D 7/08 84/385 P
9,058,793 B1 * 6/2015 Yang ........................ G10D 9/04
9,583,078 B1 * 2/2017 Nagahara ............... G10D 7/026
10,019,974 B2 * 7/2018 Brown ..................... G10D 9/00
2024/0296815 A1 * 9/2024 Adachi .................. G10D 9/047

FOREIGN PATENT DOCUMENTS

JP S52159215 U 12/1977

* cited by examiner

*Primary Examiner* — Robert W Horn

(74) *Attorney, Agent, or Firm* — ROSSI, KIMMS & McDOWELL LLP

(57) ABSTRACT

A wind instrument includes a tubular body, a key, and an adjuster. The tubular body includes a tone hole. The key is mounted to the tube body, and includes a pad and an operation part. The pad is configured to cover the tone hole. The operation part is configured to move the pad away from the tone hole. The adjuster is configured to adjust a maximum distance the pad moves away from the tone hole by the operation part.

8 Claims, 18 Drawing Sheets

WIND INSTRUMENT AND KEY FOR WIND INSTRUMENT

BACKGROUND

Field

The present disclosure relates to a wind instrument and a key for the wind instrument.

Background Art

JP 52-159215 U discloses a woodwind instrument having a register key. A player of the woodwind instrument operates the register key to move a pad (tampon) away from a predetermined tone hole formed in a tubular body. The register key is provided to enable the woodwind instrument to sound harmonics.

When a wind instrument is equipped with a resister key or another key that enables harmonics, such wind instrument is required to sound harmonics more easily. For example, for a particular sound range, the wind instrument sounds harmonics more easily if the pad moves away from the tone hole over a short distance upon pressing of the key. However, in order to adjust the distance over which the pad moves away from the tone hole, it is difficult to perform such adjustment quickly and precisely by a finger operation. Also, such finger operation involves a high level of performing technique.

The present disclosure has been made in view of the above-described and other circumstances, and has an object to provide a wind instrument that sounds harmonics more easily and to provide a key for such wind instrument.

SUMMARY

One aspect is a wind instrument that includes a tubular body, a key, and an adjuster. The tubular body includes a tone hole. The key is mounted to the tube body, and includes a pad and an operation part. The pad is configured to cover the tone hole. The operation part is configured to move the pad away from the tone hole. The adjuster is configured to adjust a maximum distance the pad moves away from the tone hole by the operation part.

Another aspect is a key for a wind instrument. The key is mountable to a tubular body including a tone hole. The key includes a pad, an operation part, and an adjuster. The pad is configured to cover the tone hole in a state where the key is mounted to the tubular body. The operation part is configured to move the pad away from the tone hole in the state where the key is mounted to the tubular body. The adjuster is configured to adjust a maximum distance the pad moves away from the tone hole by the operation part in the state where the key is mounted to the tubular body.

BRIEF DESCRIPTION OF THE DRAWINGS

A more complete appreciation of the present disclosure and many of the attendant advantages thereof will be readily obtained as the same becomes better understood by reference to the following detailed description when considered in connection with the following figures.

DESCRIPTION OF THE EMBODIMENTS

The present development is applicable to a wind instrument and a key for the wind instrument.

First Embodiment

A first embodiment will be described below by referring to FIGS. 1 to 6.

Figure 1:
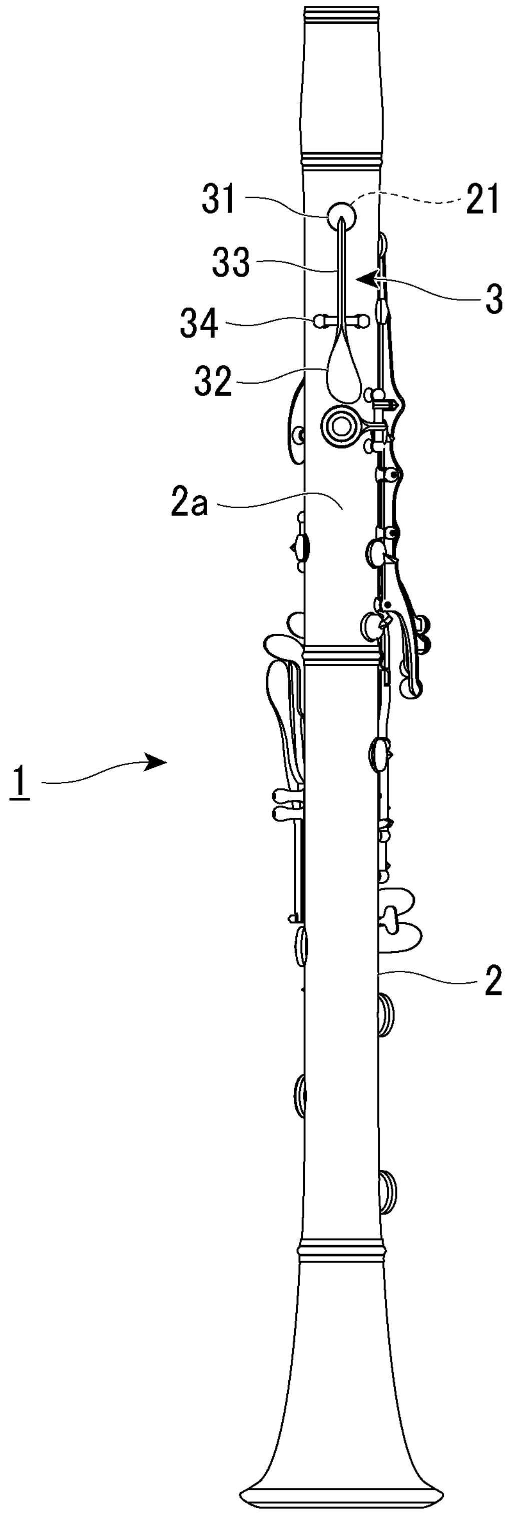
FIG. 1 is a plan view of a wind instrument according to a first embodiment.
Figure 2:
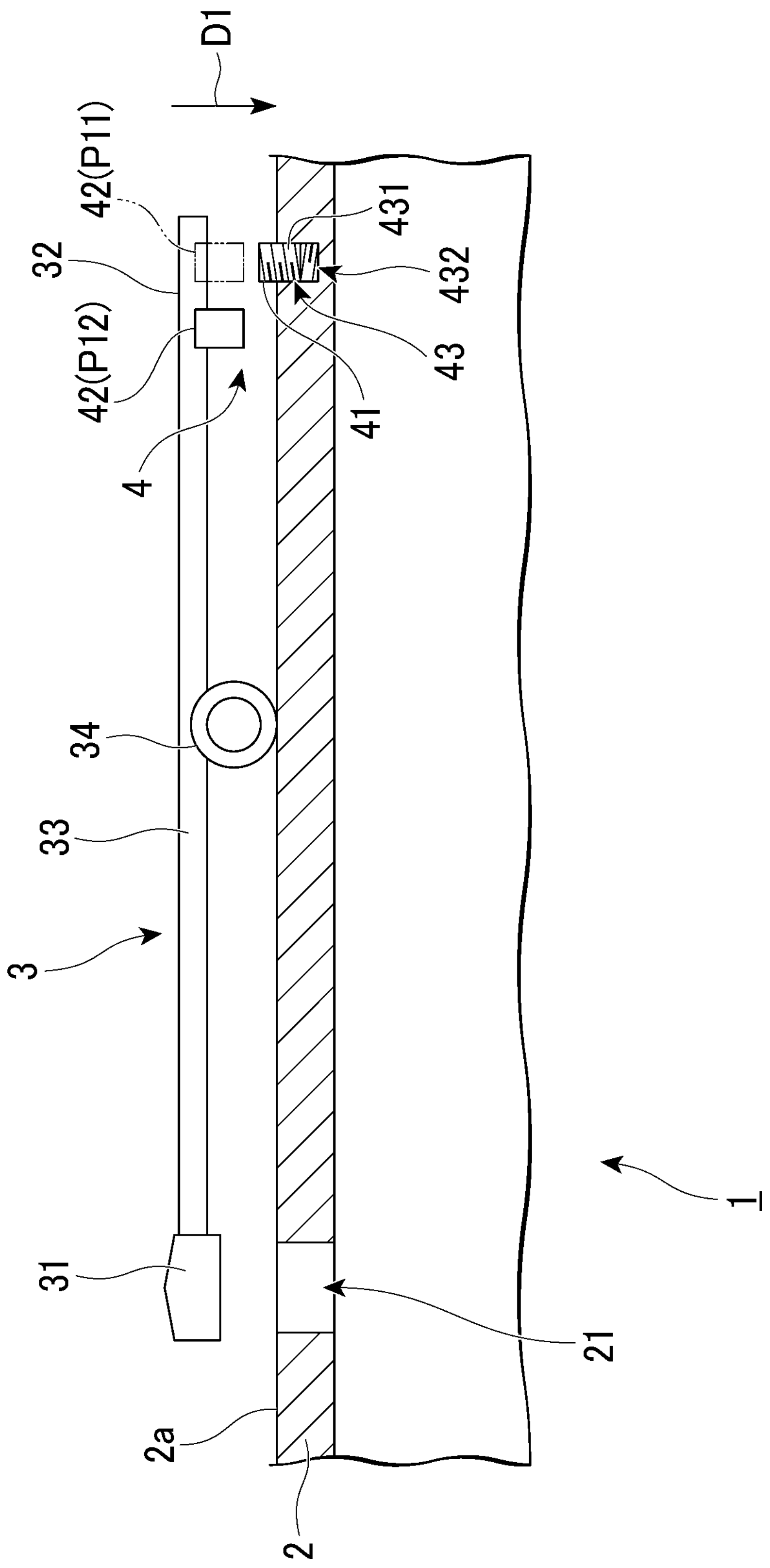
FIG. 2 is a sectional view schematically illustrating a relevant part of a tubular body and a register key disposed at the wind instrument in FIG. 1.

As illustrated in FIGS. 1 and 2, a wind instrument 1 according to the first embodiment is a clarinet, and includes a tubular body 2, a register key 3 (which can be the key for a wind instrument), and an adjuster 4.

The tubular body 2 has a cylindrical shape. A tone hole 21 is formed to penetrate the tubular body 2 between a surface 2*a* and an inner side of the tubular body 2.

The register key 3 is mounted on the surface 2*a* of the tubular body 2. The register key 3 includes a pad 31, an operation part 32, and an arm 33. The arm 33 has a seesaw (teeter-totter) structure. The pad 31 covers the tone hole 21 in the tubular body 2. The operation part 32 is operated by a user such as a player of the wind instrument 1 such that the pad 31 moves away from the tone hole 21. The arm 33 has a substantially stick shape and is mounted on the tubular body 2 at a fulcrum 34 of the seesaw structure. The pad 31 is disposed at a first end of the arm 33. The operation part 32 is disposed at a second end of the arm 33. The arm 33 is biased by a bias member (not illustrated) to keep the pad 31 closer to the tone hole 21 and keep the operation part 32 away from the surface 2*a* of the tubular body 2.

If the user of the wind instrument 1 presses the operation part 32 of the register key 3 toward the surface 2*a* of the tubular body 2 against the force of the bias member, the pad 31 moves away from the tone hole 21.

As illustrated in FIGS. 3 to 6, a buffer 35 is disposed at a part of the operation part 32 which part faces the surface 2*a* of the tubular body 2. The buffer 35 is made of a material softer than the material of the operation part 32. The buffer 35 may be made of cork, for example. The buffer 35 prevents the operation part 32 from directly hitting the tubular body 2 when the user presses the operation part 32 toward the surface 2*a* of the tubular body 2.

The adjuster 4 adjusts the maximum of the distance over which the pad 31 is moved away from the tone hole 21 by the operation part 32 operated by the user. The adjuster 4 according to the first embodiment includes a protrusion 41, an adjustment lever 42, and a height adjuster 43.

Figure 3:
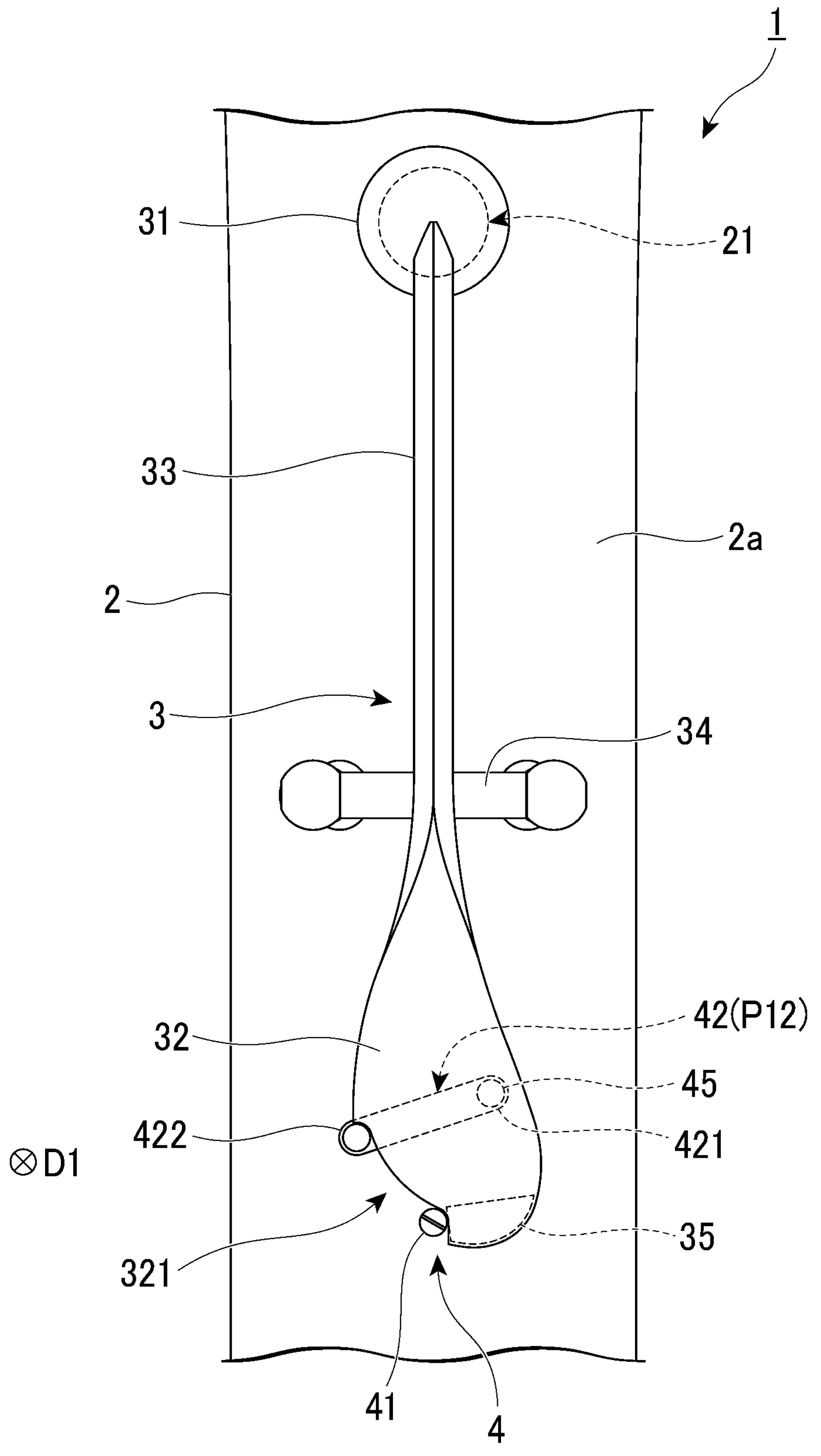
FIG. 3 is an enlarged plan view of an adjustment lever disposed at an operation part of the register key of the wind instrument according to the first embodiment when the adjustment lever is disposed in a second position.
Figure 5:
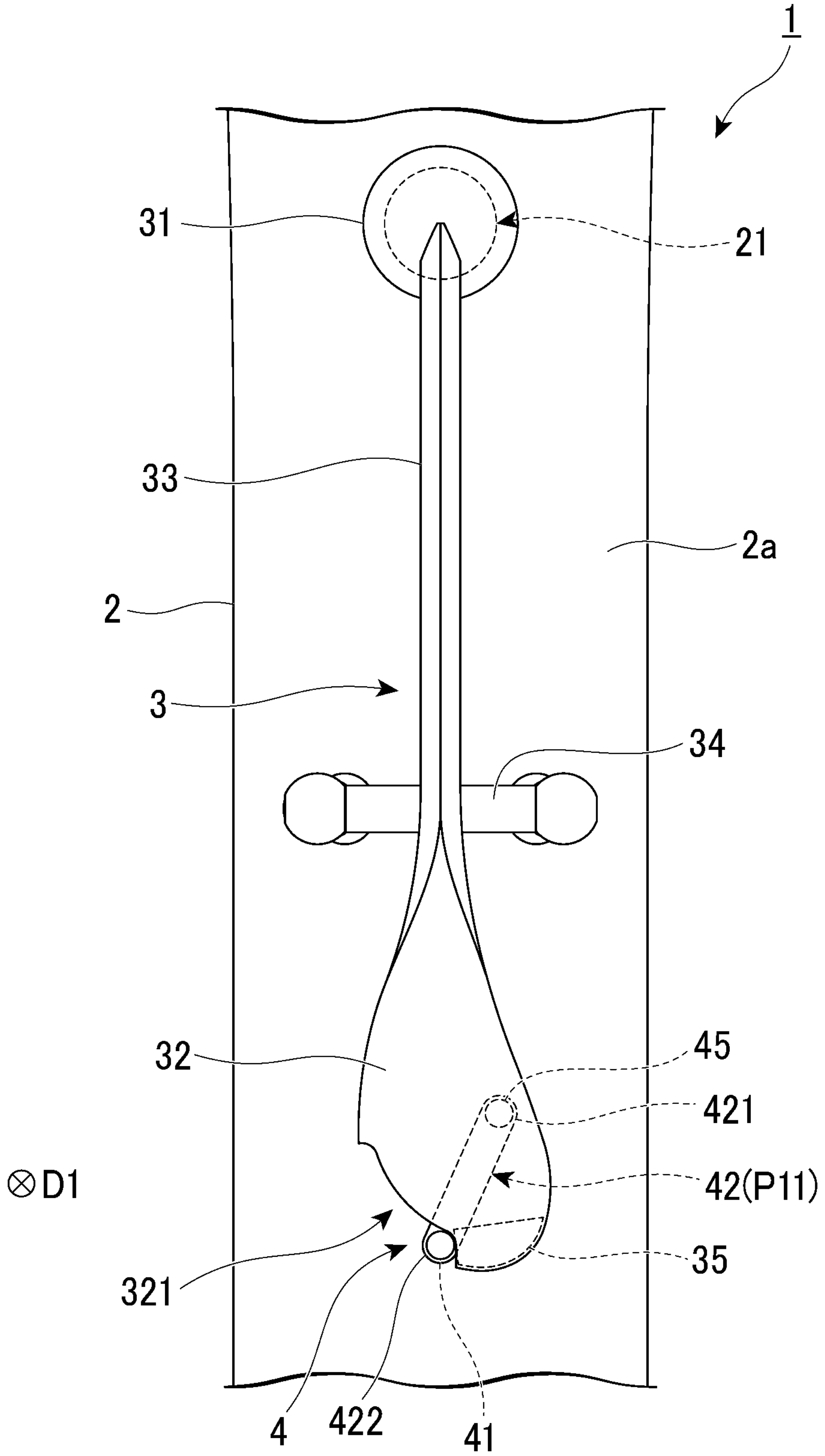
FIG. 5 is an enlarged plan view of the adjustment lever disposed at the operation part of the register key of the wind instrument according to the first embodiment when the adjustment lever is disposed in a first position.

The protrusion 41 protrudes from the surface 2*a* of the tubular body 2. As illustrated in FIGS. 3 and 5, the protrusion 41 may be disposed at a position where there is no overlapping between the protrusion 41 and at least the operation part 32 and the buffer 35 when viewed in a direction in which the tubular body 2 and the operation part 32 overlap each other. While the protrusion 41 is disposed at a position close to the operation part 32 and the buffer 35 in FIGS. 3 and 5, the protrusion 41 may be disposed at any other position.

Figure 4:
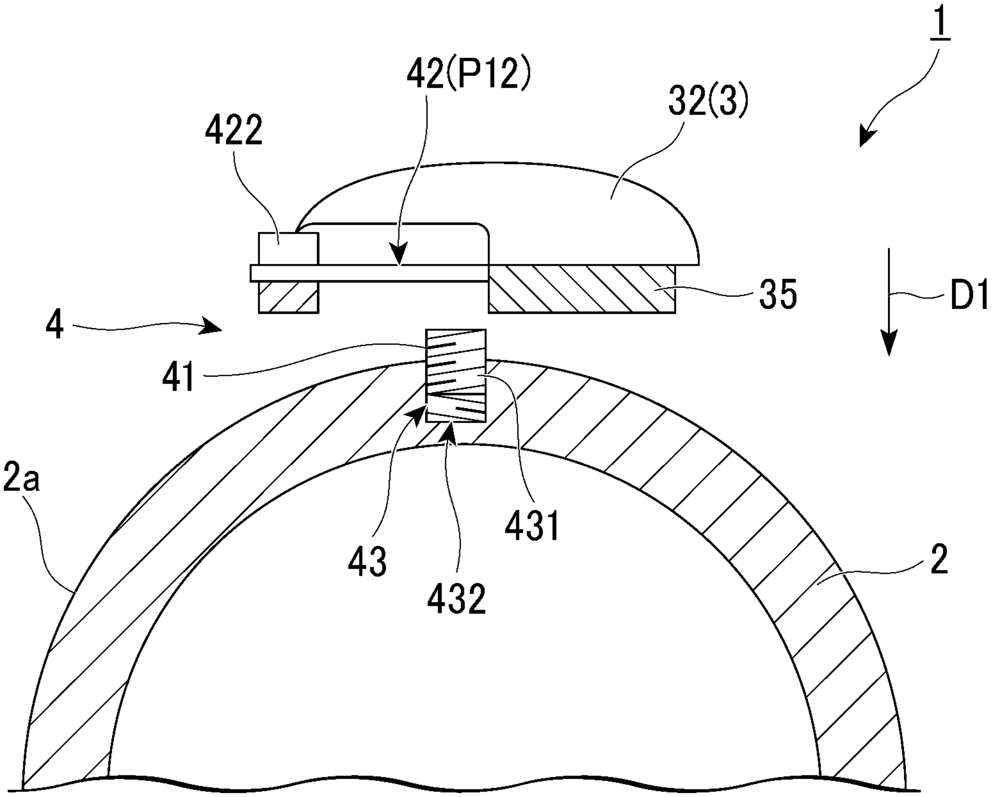
FIG. 4 is an enlarged sectional view, in an axis direction of the tubular body, of the adjustment lever disposed in the second position as illustrated in FIG. 3.
Figure 6:
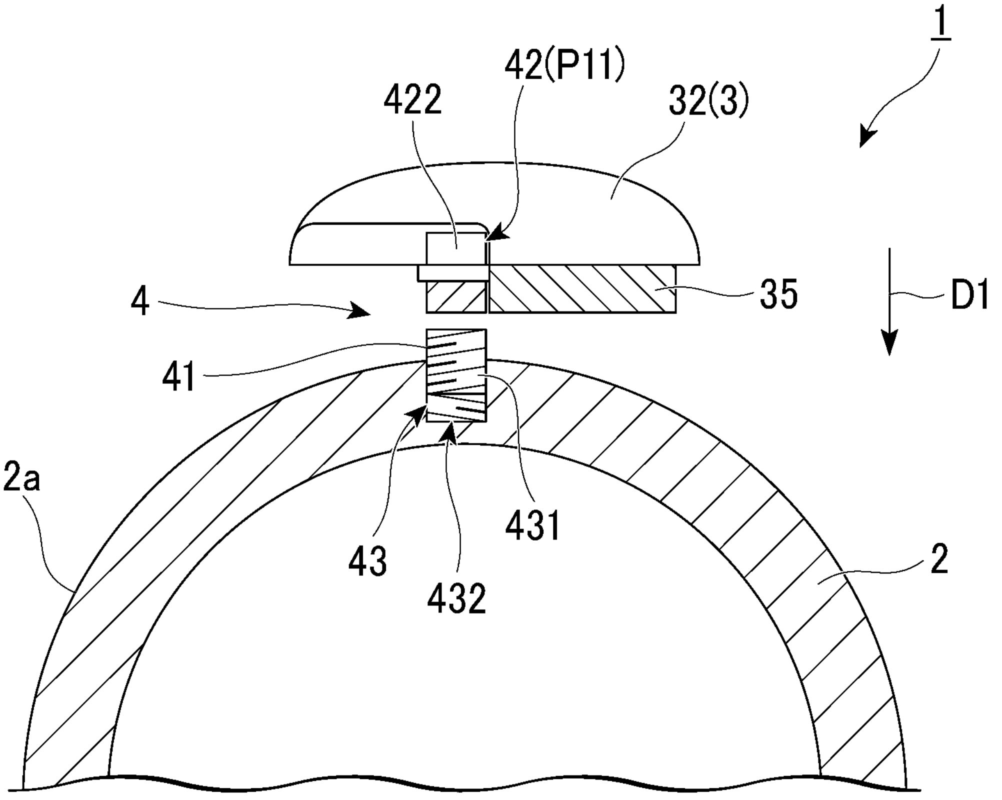
FIG. 6 is an enlarged sectional view, in the axis direction of the tubular body, of the adjustment lever disposed in the first position as illustrated in FIG. 5.

The adjustment lever 42 is mounted on the operation part 32 of the register key 3. The adjustment lever 42 is movable between a first position P11 (see FIGS. 5 and 6) and a second position P12 (see FIGS. 3 and 4). As illustrated in FIGS. 5 and 6, the adjustment lever 42 at the first position P11 faces the protrusion 41 in an operation direction D1 of the operation part 32 (a direction in which the operation part 32 moves closer to the surface 2*a* of the tubular body 2). As illustrated in FIGS. 3 and 4, the adjustment lever 42 at the second position P12 does not face the protrusion 41 in the operation direction D1 of the operation part 32.

The adjustment lever 42 according to the first embodiment will be described in more detail below.

The adjustment lever 42 according to the first embodiment has a stick shape. The adjustment lever 42 is disposed mainly at a part of the operation part 32 which part faces the surface 2*a* of the tubular body 2. The adjustment lever 42 is mounted on the operation part 32 and rotatable about its first end 421 with respect to the operation part 32. A rotation shaft 45 of the adjustment lever 42 extends substantially in the operation direction D1 of the operation part 32 or a radius direction of the tubular body 2.

A second end 422 of the adjustment lever 42 is disposed at a position where the second end 422 is not covered by the operation portion 32 when viewed in the direction in which the tubular body 2 and the operation part 32 overlap each other (the operation direction D1 of the operation part 32). As illustrated in FIGS. 3 and 5, the second end 422 of the adjustment lever 42 is disposed at a cutout 321, which is formed at a side portion of the operation part 32. Thus, the second end 422 is not covered by the operation part 32, and is exposed. This configuration of the second end 422, however, is not intended in a limiting sense. The user of the wind instrument 1 rotates and moves the adjustment lever 42 by operating the exposed second end 422 of the adjustment lever 42.

In the illustrated example, as the adjustment lever 42 rotates with respect to the operation part 32, the second end 422 of the adjustment lever 42 moves in a direction at an angle with respect to the axis direction of the tubular body 2 (the up or down direction in FIGS. 3 and 5) and the circumferential direction of the tubular body 2 (the left or right direction in FIGS. 3 and 5). Another possible example is that as the adjustment lever 42 rotates, the second end 422 of the adjustment lever 42 moves in the axis direction of the tubular body 2 or the circumferential direction of the tubular body 2.

When the adjustment lever 42 is at the first position P11 as illustrated in FIGS. 5 and 6, the second end 422 of the adjustment lever 42 faces the protrusion 41 in the operation direction D1 of the operation part 32. When the adjustment lever 42 is at the second position P12 as illustrated in FIGS. 3 and 4, the second end 422 of the adjustment lever 42 does not face the protrusion 41 in the operation direction D1 of the operation part 32.

As illustrated in FIGS. 4 and 6, the height adjuster 43 adjusts the protrusion height over which the protrusion 41 protrudes from the surface 2*a* of the tubular body 2. Specifically, the height adjuster 43 includes an external thread 431 and an internal threaded hole 432. The external thread 431 is formed on the protrusion 41. The internal threaded hole 432 is formed in the tubular body 2 and engageable with the external thread 431 of the protrusion 41. By rotating the protrusion 41 with respect to the internal threaded hole 432 to a level deemed appropriate, the protrusion height of the protrusion 41, which protrudes from the tubular body 2, can be adjusted steplessly.

When the adjustment lever 42 of the wind instrument 1 according to the first embodiment having the configuration as described above is at the second position P12 as illustrated in FIGS. 3 and 4, the second end 422 of the adjustment lever 42 does not face the protrusion 41 in the operation direction D1 of the operation part 32. This configuration enables the user to press the operation part 32 toward the surface 2*a* of the tubular body 2 until the buffer 35, which is mounted on the operation part 32, comes into contact with the surface 2*a* of the tubular body 2. That is, a relatively large maximum is set on the distance over which the pad 31 is moved away from the tone hole 21 by the operation part 32 operated by the user.

When the adjustment lever 42 is at the first position P11 as illustrated in FIGS. 5 and 6, the second end 422 of the adjustment lever 42 faces the protrusion 41 in the operation direction D1 of the operation part 32. With this configuration, when the user presses the operation part 32 toward the surface 2*a* of the tubular body 2, the second end 422 of the adjustment lever 42 comes into contact with the protrusion 41 before the buffer 35 of the operation part 32 comes into contact with the surface 2*a* of the tubular body 2. This configuration prevents the user from moving the operation part 32 further toward the surface 2*a* of the tubular body 2 after the second end 422 of the adjustment lever 42 has come into contact with the protrusion 41. That is, the maximum of the distance over which the pad 31 is moved away from the tone hole 21 by the operation part 32 operated by the user is smaller than when the adjustment lever 42 is at the second position P12.

As described above, the wind instrument 1 according to the first embodiment enables the user to change, by using the adjuster 4, the maximum of the distance over which the pad 31 is moved away from the tone hole 21 by the operation part 32 of the register key 3 operated by the user. This configuration enables the wind instrument 1 to sound harmonics more easily.

The wind instrument 1 according to the first embodiment also enables the user to change the maximum of the distance over which the pad 31 moves away from the tone hole 21 merely by moving the adjustment lever 42, which is mounted on the operation part 32, between the first position P11 and the second position P12.

The wind instrument 1 according to the first embodiment also enables the user to adjust the maximum of the distance over which the pad 31 moves away from the tone hole 21 when the adjustment lever 42 is at the first position P11 by changing, by using the height adjuster 43, the protrusion height of the protrusion 41 protruding from the surface 2*a* of the tubular body 2.

In particular, the height adjuster 43 according to the first embodiment is capable of steplessly adjusting the protrusion height of the protrusion 41, which protrudes from the tubular body 2. This configuration enables the user to finely adjust the maximum of the distance over which the pad 31 is moved away from the tone hole 21 by the operation part 32.

In the first embodiment, the adjuster 4 may not necessarily include the height adjuster 43. That is, the protrusion 41 may be fixed to the tubular body 2, so that the protrusion height of the protrusion 41 protruding from the surface 2*a* of the tubular body 2 is unchangeable.

Second Embodiment

Next, a second embodiment will be described by referring to FIGS. 7 to 10. In the above and following embodiments, elements of similar or identical structures, functions, or configurations are generally represented by like reference numerals, and those elements already described in the above embodiment will not be elaborated upon here.

As illustrated in FIGS. 7 to 10, a wind instrument 1C according to the second embodiment is a clarinet similar to the clarinet according to the first embodiment. The wind instrument 1C includes a tubular body 2, a register key 3, and an adjuster 4C.

The adjuster 4C according to the second embodiment includes a protrusion 41C, an adjustment lever 42C, and a recess 46C. The protrusion 41C is switchable between a first position P21 (see FIGS. 9 and 10) and a second position P22 (see FIGS. 7 and 8). At the first position P21, the protrusion 41C obstructs operation of the operation part 32. At the second position P22, the protrusion 41C does not obstruct the operation of the operation part 32. The adjustment lever 42C is movable with respect to the operation part 32. The protrusion 41C is disposed at the adjustment lever 42C. The adjustment lever 42C moves the protrusion 41C between the first position P21 and the second position P22 by moving with respect to the operation part 32. The recess 46C is recessed from a surface 2*a* of the tubular body 2. The protrusion 41C disposed at the second position P22 faces the recess 46C in an operation direction D1 of the operation part 32.

The adjuster 4C according to the second embodiment will be described in more detail below.

The adjustment lever 42C according to the second embodiment is similar to the adjustment lever 42 according to the first embodiment. That is, the adjustment lever 42C has a stick shape. The adjustment lever 42C is rotatable about its first end 421 with respect to the operation part 32. A rotation shaft 45 of the adjustment lever 42C extends substantially in the operation direction D1 of the operation part 32 or a radius direction of the tubular body 2. It is to be noted, however, that the adjustment lever 42C according to the second embodiment has the protrusion 41C at a second end 422 of the adjustment lever 42C. The protrusion 41C protrudes from the adjustment lever 42C toward the surface 2*a* of the tubular body 2.

In the illustrated example, as the adjustment lever 42C rotates with respect to the operation part 32, the second end 422 of the adjustment lever 42C moves in a direction at an angle with respect to an axis direction of the tubular body 2 and a circumferential direction of the tubular body 2 as according to the first embodiment. Another possible example is that as the adjustment lever 42C rotates, the second end 422 of the adjustment lever 42C moves in the axis direction of the tubular body 2 or the circumferential direction of the tubular body 2.

Figure 7:
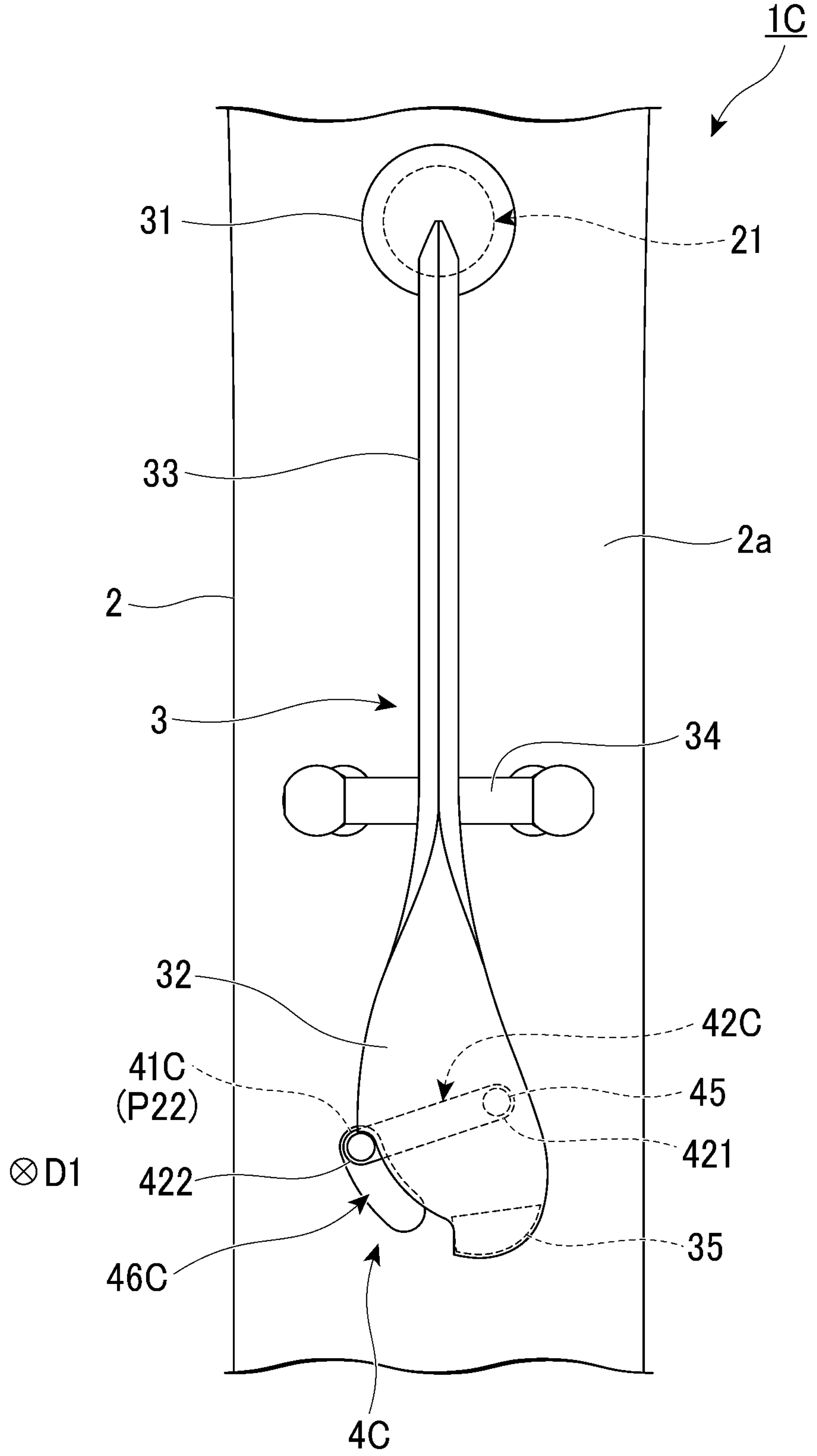
FIG. 7 is an enlarged plan view of a protrusion disposed at an adjustment lever of a wind instrument according to a second embodiment when the protrusion is disposed in a second position.
Figure 9:
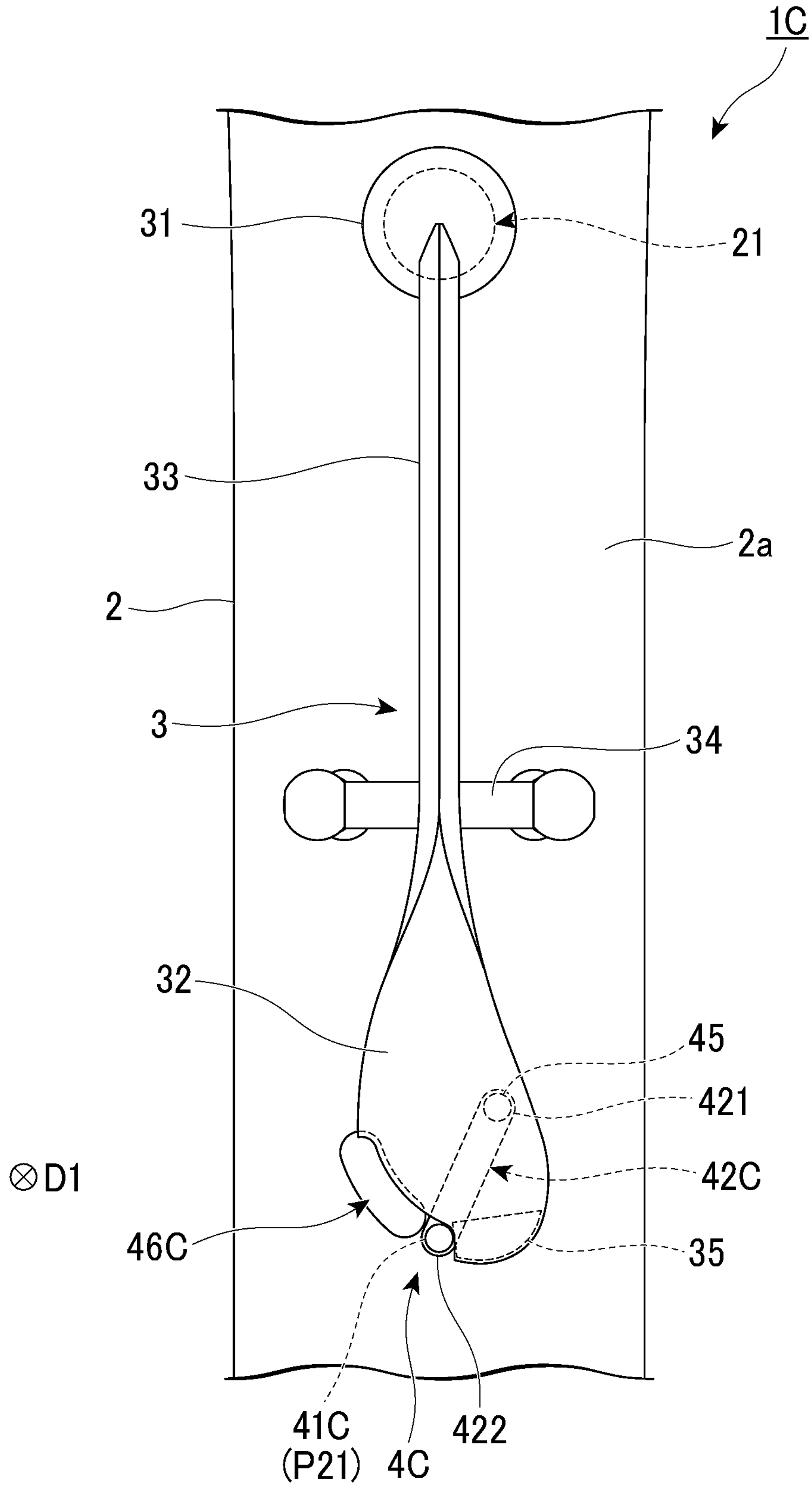
FIG. 9 is an enlarged plan view of the protrusion disposed at the adjustment lever of the wind instrument according to the second embodiment when the protrusion is disposed in a first position.

The depth of the recess 46C, which is recessed from the surface 2*a* of the tubular body 2, may be at least equivalent to or greater than the protrusion height of the protrusion 41C, which protrudes from the adjustment lever 42C. The recess 46C illustrated in FIGS. 7 and 9 is formed in the area of movement of the protrusion 41C, which moves between the first position P21 and the second position P22, when viewed in the operation direction D1 of the operation part 32. Specifically, the recess 46C is formed in the area of movement of the protrusion 41C excluding the first position P21. The recess 46C may be formed at least in an area corresponding to the second position P22 of the protrusion 41C.

Figure 8:
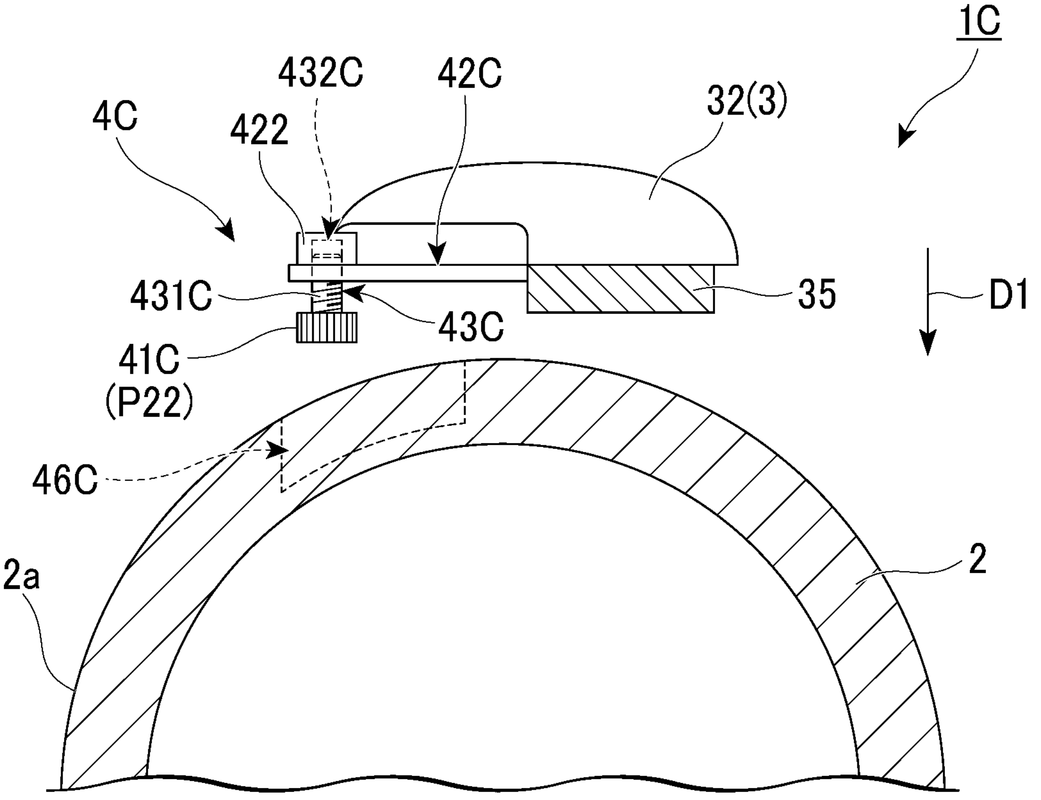
FIG. 8 is an enlarged sectional view, in an axis direction of a tubular body, of the protrusion disposed in the second position as illustrated in FIG. 7.
Figure 10:
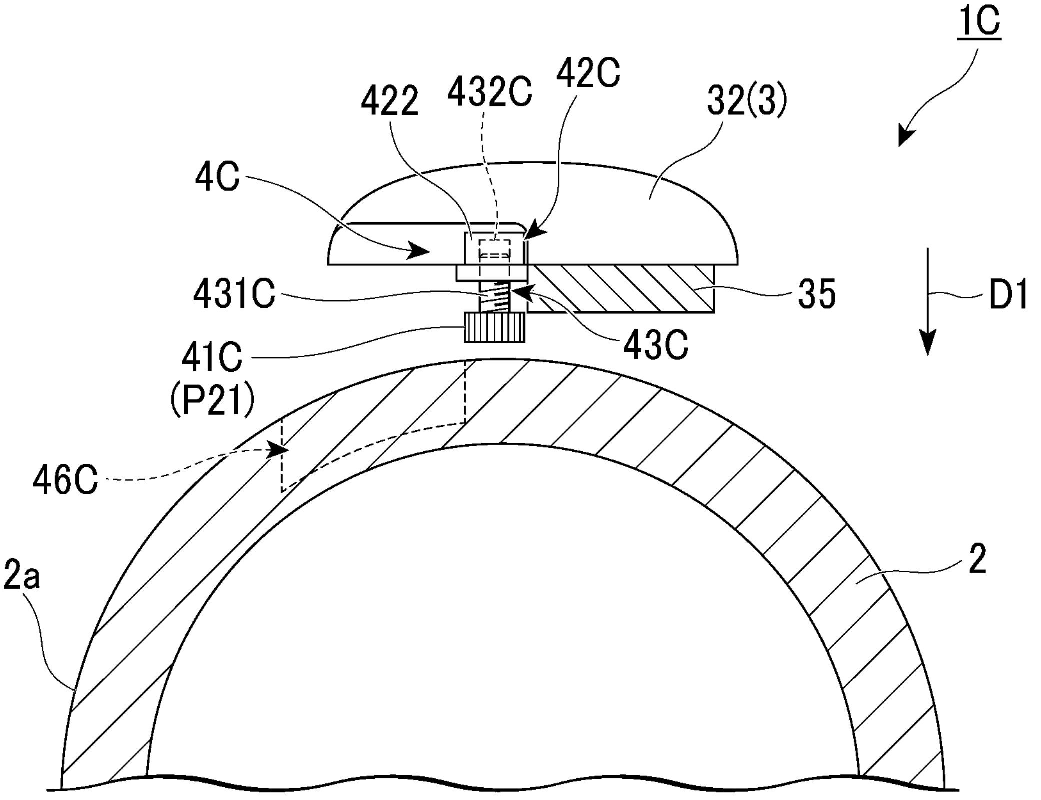
FIG. 10 is an enlarged sectional view, in the axis direction of the tubular body, of the protrusion disposed in the first position as illustrated in FIG. 9.

As illustrated in FIGS. 8 and 10, the adjustment lever 42C according to the second embodiment further includes a height adjuster 43C. The height adjuster 43C adjusts the protrusion height of the protrusion 41C, which protrudes from the adjustment lever 42C toward the surface 2*a* of the tubular body 2. Specifically, the height adjuster 43C includes an external thread 431C and an internal threaded hole 432C. The external thread 431C is formed on the protrusion 41C. The internal threaded hole 432C is formed in the adjustment lever 42C and engageable with the external thread 431C of the protrusion 41C. By rotating the protrusion 41C with respect to the internal threaded hole 432C to a level deemed appropriate, the protrusion height of the protrusion 41, which protrudes from the adjustment lever 42C, can be adjusted steplessly.

The protrusion 41C of the wind instrument 1C according to the second embodiment is configured as described above. When such protrusion 41C is at the second position P22 as illustrated in FIGS. 7 and 8, the protrusion 41C faces the recess 46C, which is formed in the tubular body 2 in the operation direction D1 of the operation part 32. This configuration enables a user to press the operation part 32 toward the surface 2*a* of the tubular body 2 until a buffer 35, which is disposed at the operation part 32, comes into contact with the surface 2*a* of the tubular body 2. That is, a relatively large maximum is set on the distance over which a pad 31 is moved away from a tone hole 21 by the operation part 32 operated by the user.

When the protrusion 41C is at the first position P21 as illustrated in FIGS. 9 and 10, the protrusion 41C does not face the recess 46C in the operation direction D1 of the operation part 32. Instead, the protrusion 41C faces the surface 2*a* of the tubular body 2. This configuration ensures that when the user presses the operation part 32 toward the surface 2*a* of the tubular body 2, the protrusion 41*C comes* into contact with the surface 2*a* of the tubular body 2 before the buffer 35 of the operation part 32 comes into contact with the surface 2*a* of the tubular body 2. This configuration prevents the user from moving the operation part 32 further toward the surface 2*a* of the tubular body 2 after the protrusion 41C has come into contact with the surface 2*a* of the tubular body 2. That is, the maximum of the distance over which the pad 31 is moved away from the tone hole 21 by the operation part 32 operated by the user is smaller than when the protrusion 41C is at the second position P22.

The wind instrument 1C according to the second embodiment provides effects similar to the effects provided by the first embodiment.

The wind instrument 1C according to the second embodiment also enables the user to change the maximum of the distance over which the pad 31 moves away from the tone hole 21 merely by switching the protrusion 41C, which is disposed at the operation part 32 of the register key 3, between the first position P21 and the second position P22.

Also in the wind instrument 1C in the second embodiment, when the protrusion 41C is disposed at the second position P22, the protrusion 41C does face the tubular body 2 in the operation direction D1 of the operation part 32. However, the protrusion 41C is brought into the recess 46C by operation of the operation part 32, thus being prevented from coming into contact with the surface 2*a* of the tubular body 2. As a result, the protrusion 41C disposed at the second position P22 does not obstruct the operation of the operation part 32. This configuration reduces the angle (or the length) of rotation movement of the adjustment lever 42C for moving the protrusion 41C between the first position P21 and the second position P22. This configuration, in turn, ensures smoothness in the adjustment of the distance over which the pad 31 is moved away from the tone hole 21 by the operation part 32 of the register key 3.

Another possible example is that the adjuster 4C according to the second embodiment does not include the height adjuster 43C. That is, the protrusion 41C may be disposed at the adjustment lever 42C in such a manner that the protrusion height of the protrusion 41C from the adjustment lever 42C is unchangeable.

Third Embodiment

Next, a third embodiment will be described by referring to FIGS. 11 to 14. In the above and following embodiments, elements of similar or identical structures, functions, or configurations are generally represented by like reference numerals, and those elements already described in the above-described embodiments will not be elaborated upon here.

As illustrated in FIGS. 11 to 14, a wind instrument 1D according to the third embodiment is a clarinet similar to the clarinet according to the first embodiment. The wind instrument 1D includes a tubular body 2, a register key 3, and an adjuster 4D. The adjuster 4D according to the third embodiment includes a protrusion 41D and an adjustment lever 42D, which are respectively similar to the protrusion 41C and the adjustment lever 42C according to the second embodiment. The adjuster 4D according to the third embodiment does not include the recess 46C (see FIGS. 7 to 10).

Figure 11:
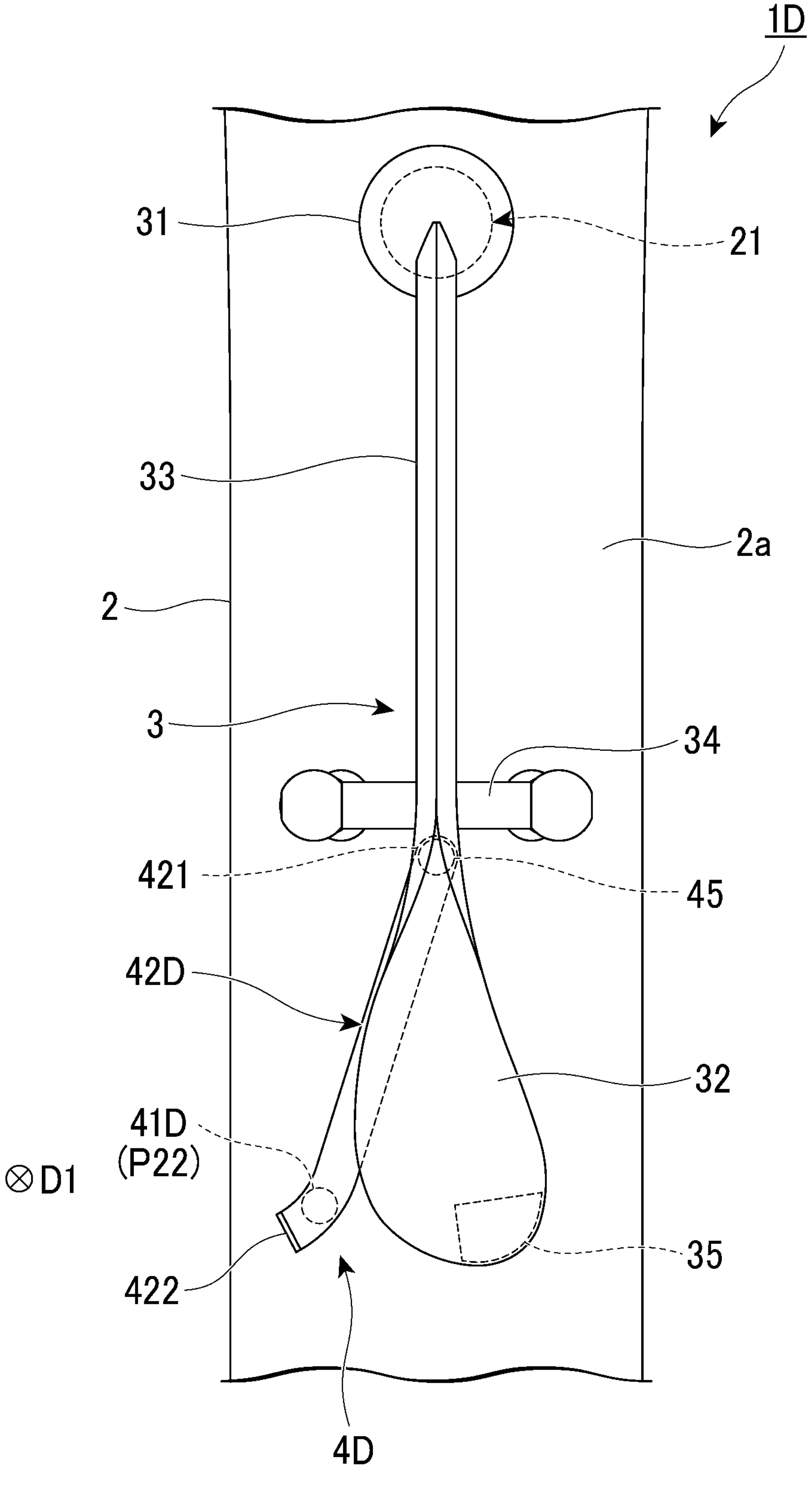
FIG. 11 is an enlarged plan view of a protrusion disposed at an adjustment lever of a wind instrument according to a third embodiment when the protrusion is disposed in a second position.
Figure 12:
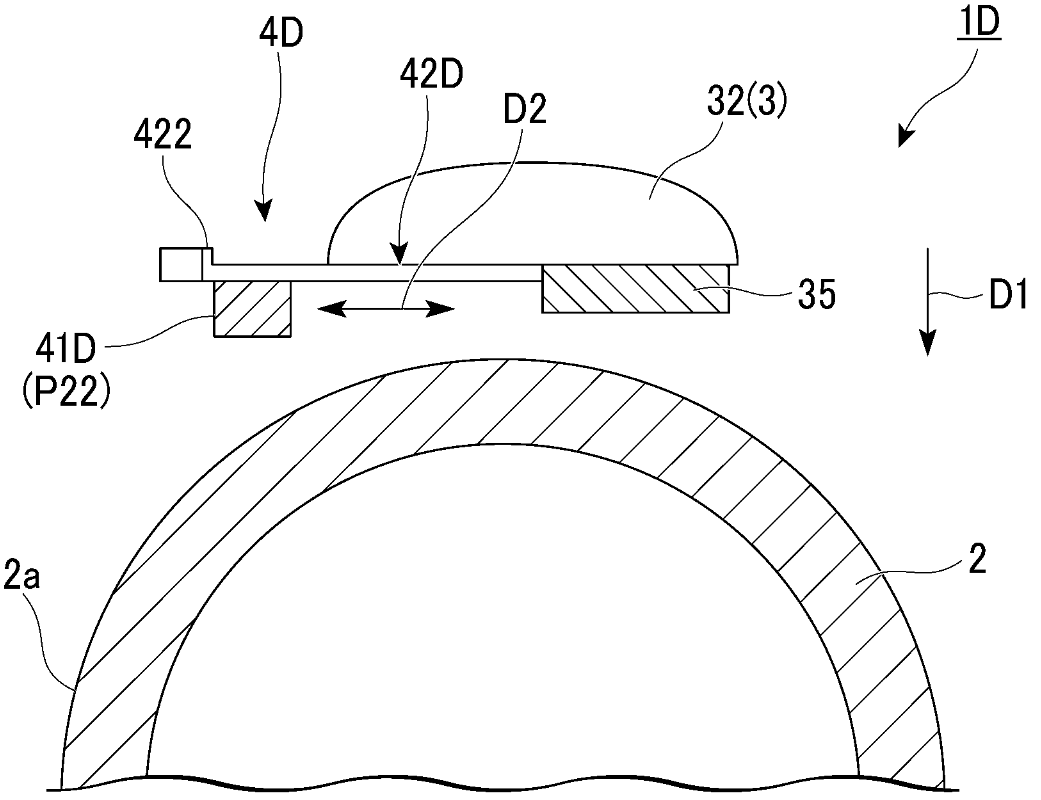
FIG. 12 is an enlarged sectional view, in an axis direction of a tubular body, of the protrusion disposed in the second position as illustrated in FIG. 11.
Figure 13:
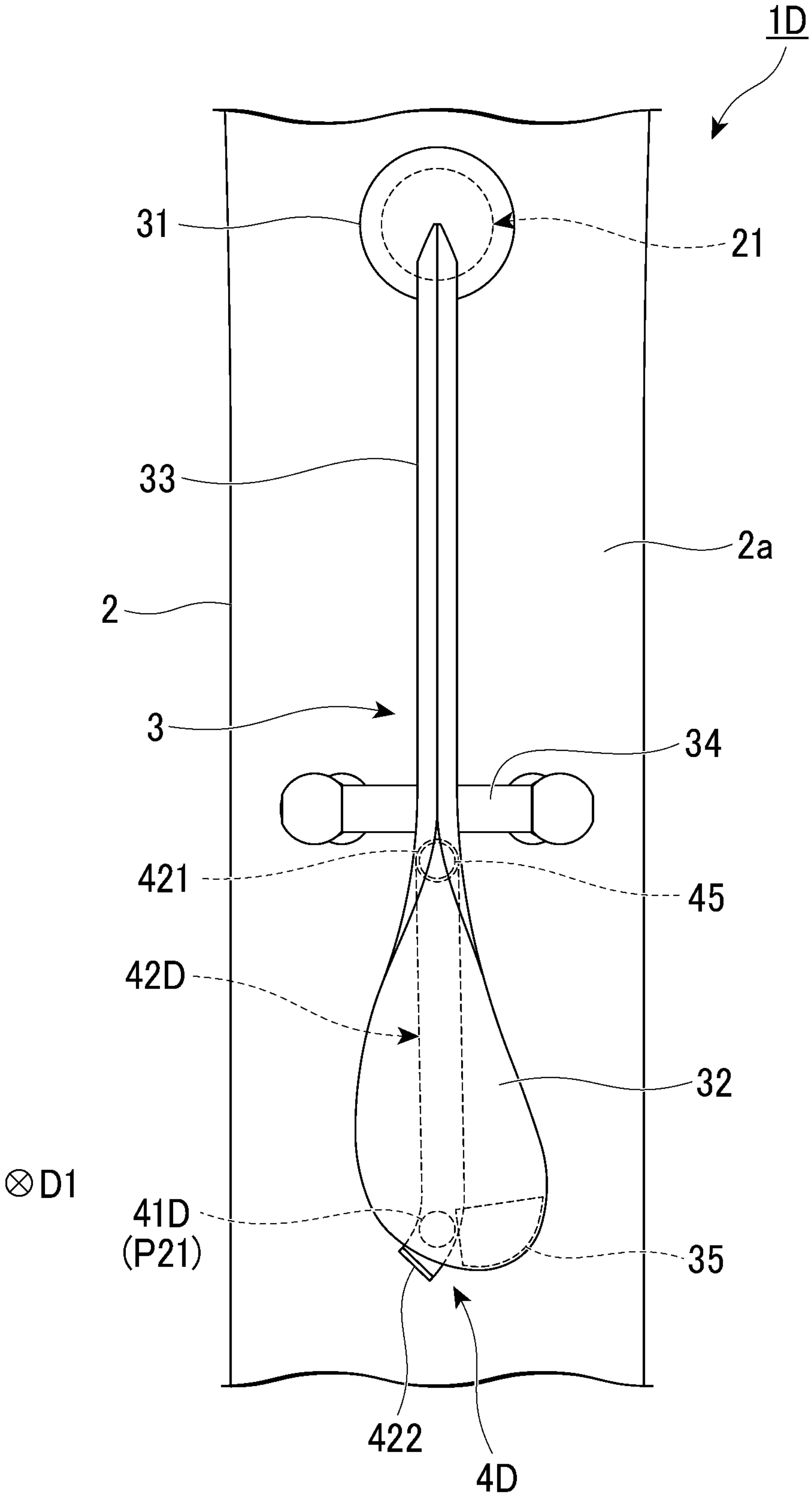
FIG. 13 is an enlarged plan view of the protrusion disposed at the adjustment lever of the wind instrument according to the third embodiment when the protrusion is disposed in a first position.
Figure 14:
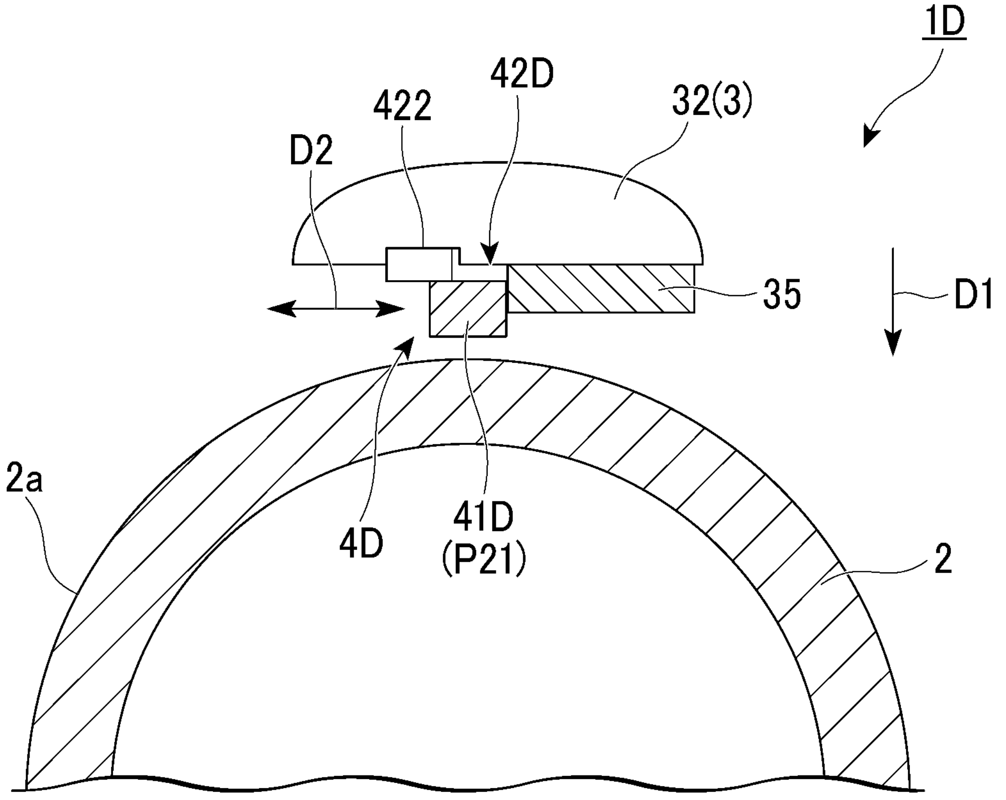
FIG. 14 is an enlarged sectional view, in the axis direction of the tubular body, of the protrusion disposed in the first position as illustrated in FIG. 13.

In the third embodiment, the adjustment lever 42D has a second end 422, at which the protrusion 41D is disposed. As illustrated in FIGS. 12 and 14, the second end 422 is movable, when viewed in an axis direction of the tubular body 2, in a tangent direction D2 (the left or right direction in FIGS. 12 and 14) of a surface 2*a* of the tubular body 2, which has a circular cross-section. As illustrated in FIGS. 11 and 13, the second end 422 of the adjustment lever 42D is also movable, when viewed in an operation direction D1 of the operation part 32, mainly in a direction (the left or right direction in FIGS. 11 and 13) along a circumferential direction of the tubular body 2. In the third embodiment, the adjustment lever 42D is preferably long enough to ensure a large length for the movement of the protrusion 41D between a first position P21 and a second position P22.

As illustrated in FIGS. 12 and 14, the protrusion 41D according to the third embodiment is fixed to the second end 422 of the adjustment lever 42D such that the protrusion height of the protrusion 41D from the adjustment lever 42D is unchangeable. Another possible example is that the protrusion 41D is mounted on the adjustment lever 42D such that the protrusion height of the protrusion 41D from the adjustment lever 42D is changeable as in the second embodiment.

The protrusion 41D of the wind instrument 1D according to the third embodiment is configured as described above. When such protrusion 41D is at the first position P21 as illustrated in FIGS. 13 and 14, the protrusion 41D is disposed at a position close to the surface 2*a* of the tubular body 2 in the operation direction D1 of the operation part 32. In FIG. 14, the distance between the protrusion 41D at the first position P21 and the surface 2*a* of the tubular body 2 is shorter than the distance between a buffer 35 and the surface 2*a* of the tubular body 2 in the operation direction D1 of the operation part 32. This configuration ensures that when a user presses the operation part 32 toward the surface 2*a* of the tubular body 2, the protrusion 41D comes into contact with the surface 2*a* of the tubular body 2 before the buffer 35 of the operation part 32 comes into contact with the surface 2*a* of the tubular body 2. That is, a relatively small maximum is set on the distance over which a pad 31 is moved away from a tone hole 21 by the operation part 32 operated by the user.

The protrusion 41D is movable between the first position P21 illustrated in FIGS. 13 and 14 and the second position P22 illustrated in FIGS. 11 and 12. Specifically, as illustrated in FIGS. 12 and 14, the protrusion 41D moves, when viewed in the axis direction of the tubular body 2, in the tangent direction D2 of the surface 2*a* of the tubular body 2, which has a circular cross-section. This configuration ensures that when the protrusion 41D is at the second position P22, the protrusion 41D is farther away from the surface 2*a* of the tubular body 2 in the operation direction D1 of the operation part 32 than when the protrusion 41D is at the first position P21. In FIG. 12, the distance between the protrusion 41D at the second position P22 and the surface 2*a* of the tubular body 2 is longer than the distance between the buffer 35 and the surface 2*a* of the tubular body 2 in the operation direction D1 of the operation part 32. This configuration enables the user to press the operation part 32 toward the surface 2*a* of the tubular body 2 until the buffer 35, which is mounted on the operation part 32, comes into contact with the surface 2*a* of the tubular body 2. That is, the maximum of the distance over which the pad 31 is moved away from the tone hole 21 by the operation part 32 operated by the user is larger than when the protrusion 41D is at the first position P21.

The wind instrument 1D according to the third embodiment provides effects similar to the effects provided by the second embodiment.

Also in the wind instrument 1D according to the third embodiment, the protrusion 41D and the adjustment lever 42D, which moves the protrusion 41D between the first position P21 and the second position P22, are disposed at the register key 3. Also in the tubular body 2 according to the third embodiment, there are no components of the adjuster 4D (for example, the protrusion 41 according to the first embodiment and the recess 46C according to the second embodiment). This configuration facilitates mounting of the adjuster 4D on the wind instrument 1D, that is, it is only necessary to mount the register key 3 including the protrusion 41D and the adjustment lever 42D to the tubular body 2.

Fourth Embodiment

Next, a fourth embodiment will be described by referring to FIGS. 15 to 17. In the above and following embodiments, elements of similar or identical structures, functions, or configurations are generally represented by like reference numerals, and those elements already described in the above-described embodiments will not be elaborated upon here.

Figure 15:
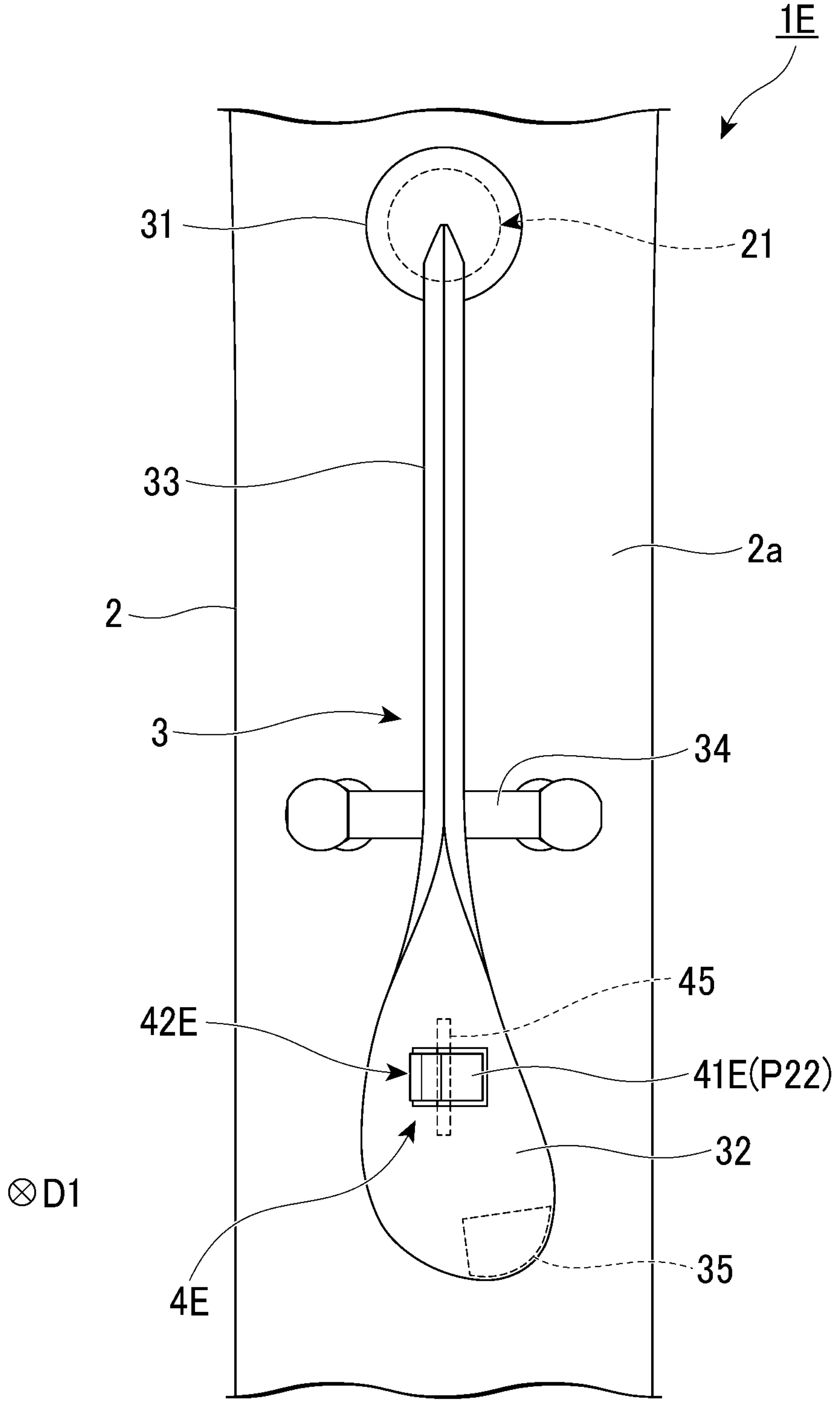
FIG. 15 is an enlarged plan view of a protrusion disposed at an adjustment lever of a wind instrument according to a fourth embodiment when the protrusion is disposed in a second position.
Figure 16:
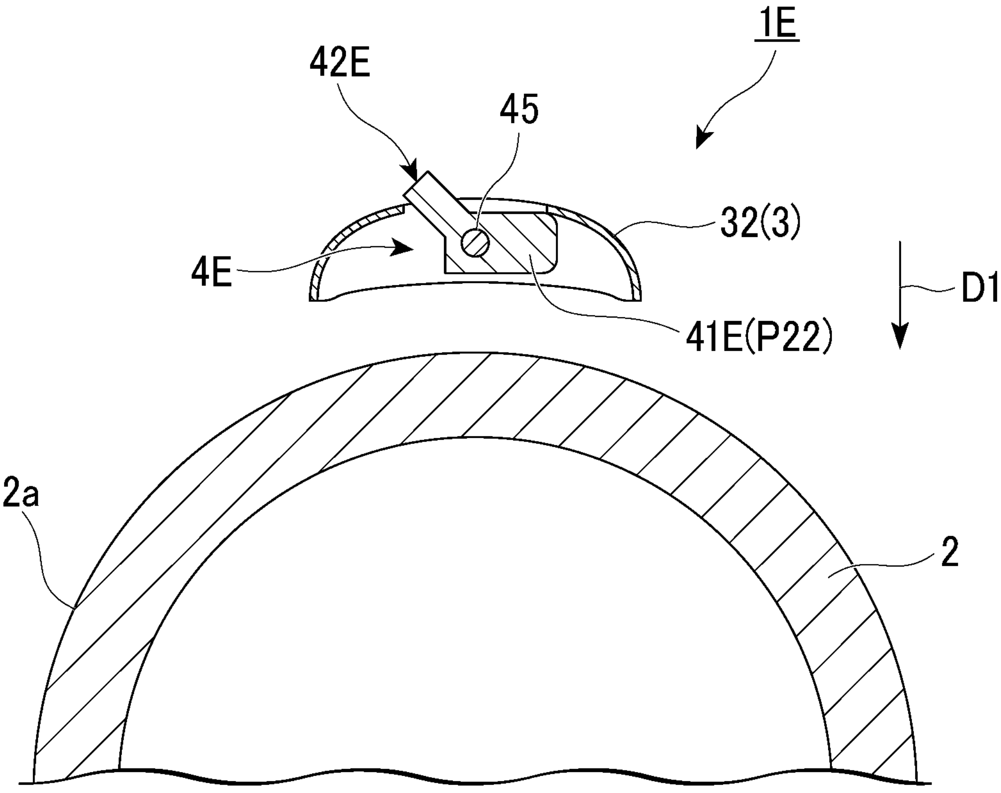
FIG. 16 is an enlarged sectional view, in an axis direction of a tubular body, of the protrusion disposed in the second position as illustrated in FIG. 15.
Figure 17:
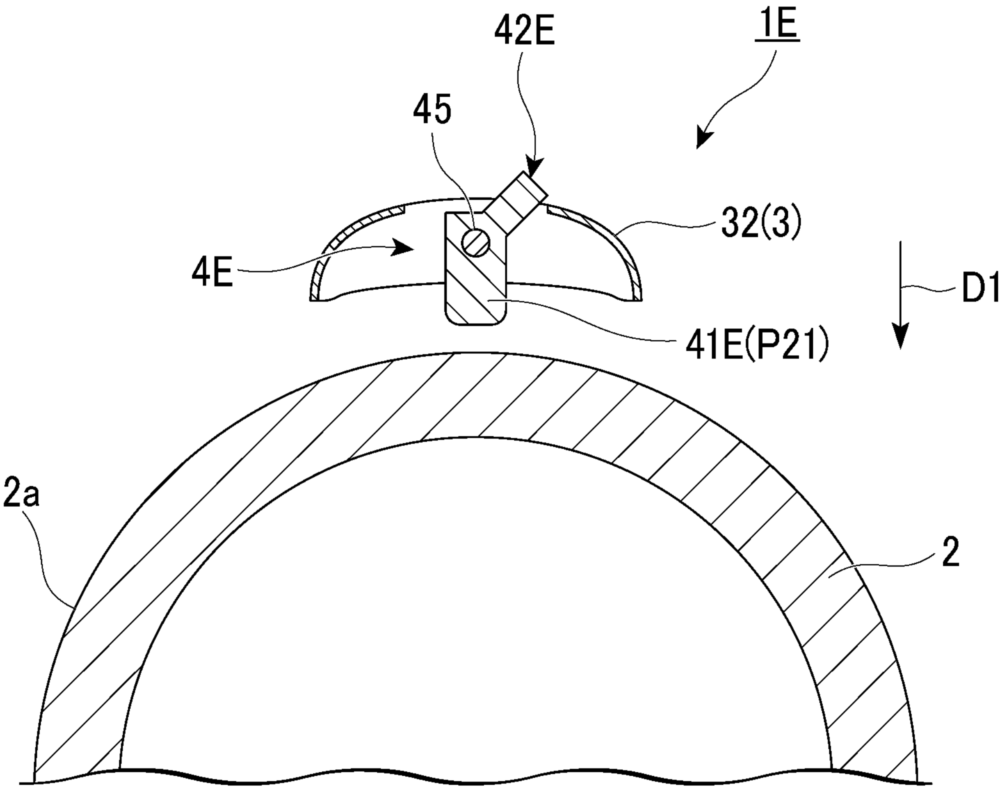
FIG. 17 is an enlarged sectional view of the protrusion disposed at the adjustment lever of the wind instrument according to the fourth embodiment when the protrusion is disposed in a first position.

As illustrated in FIGS. 15 to 17, a wind instrument 1E according to the fourth embodiment is a clarinet similar to the clarinet according to the first embodiment. The wind instrument 1E includes a tubular body 2, a register key 3, and an adjuster 4F. The adjuster 4E according to the fourth embodiment includes a protrusion 41E and an adjustment lever 42E, which are respectively similar to the protrusions 41C and 41D and the adjustment levers 42C and 42D according to the second and third embodiments.

The adjustment lever 42E according to the fourth embodiment is mounted on an operation part 32 and rotatable with respect to the operation part 32, similarly to the second and third embodiments. It is to be noted that in the fourth embodiment, a rotation axis 45 of the adjustment lever 42E extends substantially in a direction orthogonal to an operation direction D1 of the operation part 32 or a radius direction of the tubular body 2. In FIG. 15, the rotation shaft 45 of the adjustment lever 42E extends in an axis direction of the tubular body 2 (a longitudinal direction of an arm 33). This configuration ensures that the part of the adjustment lever 42E which part is touched by a user is movable along a circumferential direction of the tubular body 2. Another possible example is that the rotation shaft 45 of the adjustment lever 42F extends along the circumferential direction of the tubular body 2. In this case, the part of the adjustment lever 42E which part is touched by the user is movable in the axis direction of the tubular body 2.

As illustrated in FIGS. 16 and 17, the protrusion 41E according to the fourth embodiment is disposed at the adjustment lever 42E, similarly to the second and third embodiments. The protrusion 41E has a length toward a surface 2*a* of the tubular body 2 from a part of the operation part 32 which part faces the surface 2*a* of the tubular body 2. This length of the protrusion 41E is changeable depending on the rotation position of the adjustment lever 42F. When the protrusion 41E is at a first position P21 as illustrated in FIG. 17, the protrusion height of the protrusion 41E, which protrudes from the operation part 32 toward the surface 2*a* of the tubular body 2, is maximum. When the protrusion 41E is at a second position P22 as illustrated in FIG. 16, the protrusion height of the protrusion 41E, which protrudes from the operation part 32 toward the surface 2*a* of the tubular body 2, is minimum, or the protrusion 41E does not protrude from the operation part 32 toward the surface 2*a* of the tubular body 2.

The protrusion 41E of the wind instrument 1E according to the fourth embodiment is configured as described above. When such protrusion 41E is at the second position P22 as illustrated in FIG. 16, the protrusion height of the protrusion 41E, which protrudes from the operation part 32, is small, or the protrusion 41E does not protrude from the operation part 32. This configuration enables the user to press the operation part 32 toward the surface 2*a* of the tubular body 2 until a buffer 35 of the operation part 32 comes into contact with the surface 2*a* of the tubular body 2. That is, a relatively large maximum is set on the distance over which a pad 31 is moved away from a tone hole 21 by the operation part 32 operated by the user.

When the protrusion 41E is at the first position P21 as illustrated in FIG. 17, the protrusion height of the protrusion 41E, which protrudes from the operation part 32, is larger than when the protrusion 41E is at the second position P22. This configuration ensures that when the user presses the operation part 32 toward the surface 2*a* of the tubular body 2, the protrusion 41E comes into contact with the surface 2*a* of the tubular body 2 before the buffer 35 of the operation part 32 comes into contact with the surface 2*a* of the tubular body 2. That is, the maximum of the distance over which the pad 31 is moved away from the tone hole 21 by the operation part 32 operated by the user is smaller than when the protrusion 41E is at the second position P22.

The wind instrument 1E according to the fourth embodiment provides effects similar to the effects provided by the second and third embodiments.

Fifth Embodiment

Next, a fifth embodiment will be described by referring to FIG. 18. In the above and following embodiments, elements of similar or identical structures, functions, or configurations are generally represented by like reference numerals, and those elements already described in the above-described embodiments will not be elaborated upon here.

Figure 18:
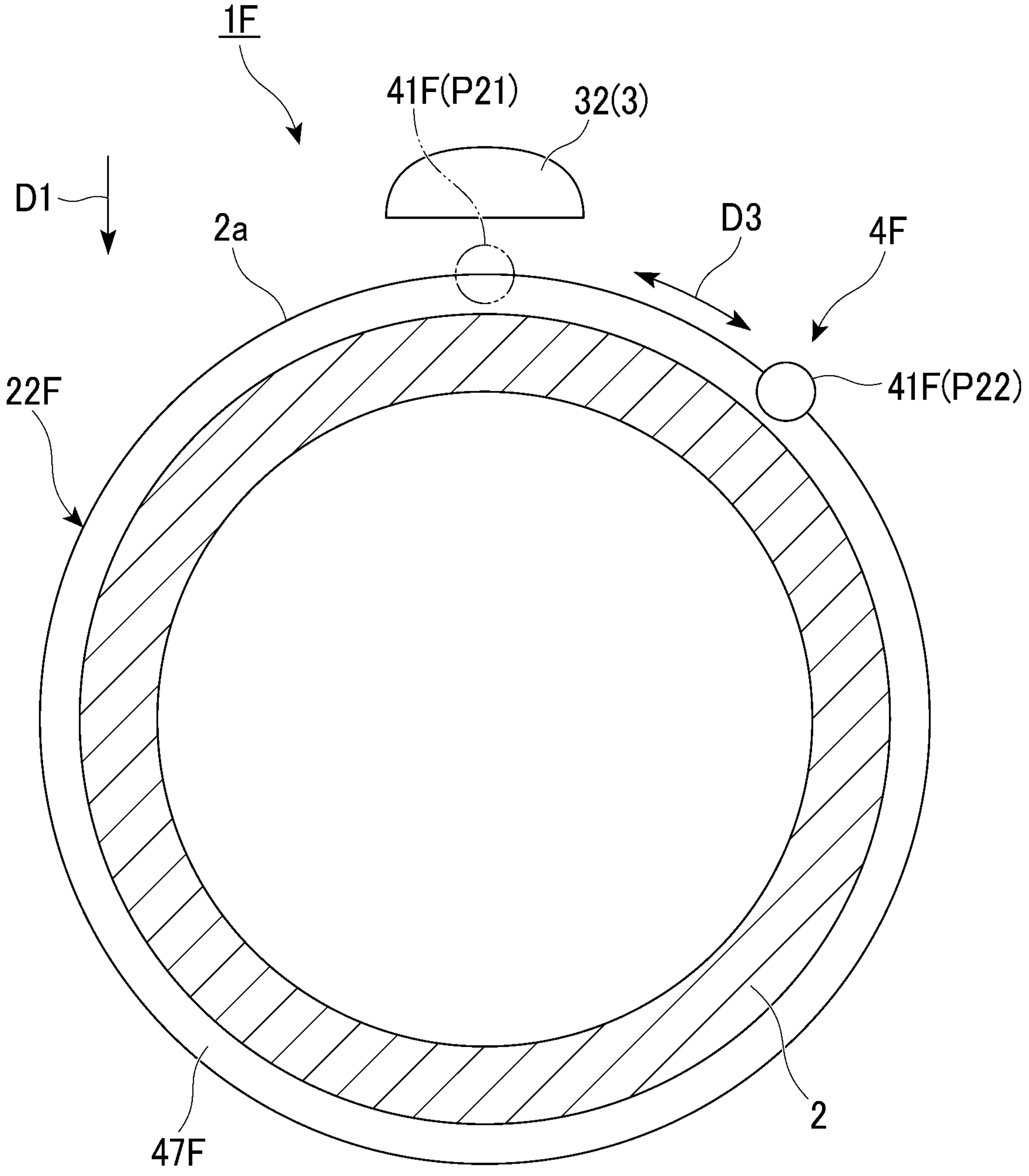
FIG. 18 is an enlarged sectional view, in an axis direction of a tubular body, of a protrusion disposed at an adjustment lever of a wind instrument according to a fifth embodiment when the protrusion is disposed in a second position.

As illustrated in FIG. 18, a wind instrument 1F according to the fifth embodiment is a clarinet similar to the clarinet according to the first embodiment. The wind instrument 1F includes a tubular body 2, a register key 3, and an adjuster 4F. The adjuster 4F according to the fifth embodiment includes a protrusion 41F and a ring 47F.

The ring 47F is rotatable about an axis direction of the tubular body 2 with respect to the tubular body 2. Reference sign D3 in FIG. 18 indicates a rotation direction of the ring 47F. The ring 47F is disposed in an annular groove 22F. The annular groove 22F is formed in a surface 2*a* of the tubular body 2. This configuration eliminates or minimizes protrusion of the ring 47F from the surface 2*a* of the tubular body 2. A part of the ring 47F in its circumferential direction overlaps an operation part 32 in an operation direction D1 of the operation part 32.

The protrusion 41F is mounted on this part in the circumferential direction of the ring 47F. The protrusion 41F, which is mounted on the ring 47F, protrudes from the surface 2*a* of the tubular body 2.

In the adjuster 4F according to the fifth embodiment, by rotating with respect to the tubular body 2, the ring 47F moves the protrusion 41F between a first position P21 for obstructing operation of the operation part 32 and a second position P22 for not obstructing the operation of the operation part 32. Specifically, at the first position P21, the protrusion 41F is positioned between the surface 2*a* of the tubular body 2 and the operation part 32. At the second position P22, the protrusion 41F is not positioned between the surface 2*a* of the tubular body 2 and the operation part 32.

The wind instrument 1F according to the fifth embodiment is configured as described above. In such wind instrument 1F, the protrusion 41F at the first position P21 is positioned between the surface 2*a* of the tubular body 2 and the operation part 32. With this configuration, a relatively small maximum is set on the distance over which a pad 31 is moved away from a tone hole 21 by the operation part 32 operated by a user.

At the second position P22, the protrusion 41F is not positioned between the surface 2*a* of the tubular body 2 and the operation part 32. With this configuration, the maximum of the distance over which the pad 31 is moved away from the tone hole 21 by the operation part 32 operated by the user is larger than when the protrusion 41F is at the first position P21.

The wind instrument 1F according to the fifth embodiment provides effects similar to the effects provided by the second to fourth embodiments.

The wind instrument 1F according to the fifth embodiment also enables the user to move the protrusion 41F between the first position P21 and the second position P22 without touching the operation part 32 of the register key 3.

While embodiments of the present disclosure have been described, the embodiments are intended as illustrative only and are not intended to limit the scope of the present disclosure. It will be understood that the present disclosure can be embodied in other forms without departing from the scope of the present disclosure, and that other omissions, substitutions, additions, and/or alterations can be made to the embodiments. Thus, these embodiments and modifications thereof are intended to be encompassed by the scope of the present disclosure. The scope of the present disclosure accordingly is to be defined as set forth in the appended claims.

In the present disclosure, the adjuster may not necessarily be disposed at the second end (the operation part 32) of the arm 33 as in the above-described embodiments. Another possible example is that the adjuster is disposed at the first end (the pad 31) of the arm 33. In this case, the adjuster may be formed by, for example, a restriction part mounted on the tubular body 2. The restriction part is disposed such that the first end (the pad 31) of the arm 33 is positioned between the surface 2*a* of the tubular body 2 and the restriction part. The distance between the surface 2*a* of the tubular body 2 and the restriction part may be adjustable. Specifically, by increasing the distance between the surface 2*a* of the tubular body 2 and the restriction part, the maximum of the distance over which the pad 31 is moved away from the tone hole 21 by the operation part 32 is increased. By reducing the distance between the surface 2*a* of the tubular body 2 and the restriction part, the maximum of the distance over which the pad 31 is moved away from the tone hole 21 by the operation part 32 is reduced.

The present disclosure is applicable not only to a clarinet having a resister key but also to a wind instrument having a key for sounding harmonics. Examples such wind instrument include a saxophone having an octave key and a bassoon having an octave key.

What is claimed is:

1. A wind instrument comprising:

a tubular body including a tone hole;

a key mounted to the tubular body and comprising:

a pad configured to cover the tone hole; and an operation part configured to move the pad away from the tone hole; and an adjuster configured to adjust a maximum distance the pad moves away from the tone hole by the operation part.

2. The wind instrument according to claim 1, wherein:

the key further comprises an arm and a fulcrum mounted on the tubular body, the arm is pivotable about the fulcrum, the pad is disposed at a first end of the arm, the operation part is disposed at a second end of the arm, the adjuster comprises a protrusion that is switchable between a first position and a second position, at the first position, the protrusion obstructs operation of the operation part, and at the second position, the protrusion does not obstruct the operation of the operation part.

3. The wind instrument according to claim 2, wherein:

the adjuster further comprises an adjustment lever mounted on the operation part, the protrusion is disposed on the adjustment lever, and the adjustment lever is configured to move the protrusion between the first position and the second position.

4. The wind instrument according to claim 3, wherein:

the adjuster further comprises a recess recessed from a surface of the tubular body, and at the second position, the protrusion faces the recess in an operation direction of the operation part.

5. The wind instrument according to claim 2, wherein:

the adjuster further comprises a ring mounted on the tubular body and rotatable about an axis direction of the tubular body with respect to the tubular body, the protrusion is mounted to the ring, and the ring is configured to move the protrusion between the first position and the second position by rotating the ring with respect to the tubular body.

6. The wind instrument according to claim 1, wherein:

the key further comprises an arm and a fulcrum mounted on the tubular body, the arm is pivotable about the fulcrum, the pad is disposed at a first end of the arm, the operation part is disposed at a second end of the arm, the adjuster comprises:

a protrusion protruding from the surface of the tubular body; and an adjustment lever mounted on the operation part, the adjustment lever is movable between a first position and a second position, at the first position, the adjustment lever faces the protrusion in an operation direction of the operation part, and at the second position, the adjustment lever does not face the protrusion in the operation direction of the operation part.

7. The wind instrument according to claim 6, wherein the protrusion is height adjustable to adjust a height of the protrusion protruding from a surface of the tubular body.

8. A key for a wind instrument and mountable to a tubular body including a tone hole, the key comprising:

a pad configured to cover the tone hole in a state where the key is mounted to the tubular body;

an operation part configured to move the pad away from the tone hole in the state where the key is mounted to the tubular body; and an adjuster configured to adjust a maximum distance the pad moves away from the tone hole by the operation part in the state where the key is mounted to the tubular body.

* * * * *